US010454715B1

United States Patent
Uttaro et al.

(10) Patent No.: US 10,454,715 B1
(45) Date of Patent: *Oct. 22, 2019

(54) VIRTUAL PRIVATE WIRE SERVICE INTERWORKING

(71) Applicant: AT&T Intellectual Property I, L.P., Atlanta, GA (US)

(72) Inventors: James Uttaro, Staten Island, NY (US); Tuan Duong, Eatontown, NJ (US); Han Nguyen, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,562

(22) Filed: May 3, 2018

(51) Int. Cl.
*H04L 12/46* (2006.01)
*H04L 12/66* (2006.01)
*H04L 12/24* (2006.01)
*H04L 12/721* (2013.01)

(52) U.S. Cl.
CPC .......... *H04L 12/66* (2013.01); *H04L 12/4641* (2013.01); *H04L 41/0803* (2013.01); *H04L 45/38* (2013.01)

(58) Field of Classification Search
CPC . H04L 12/46; H04L 12/4633; H04L 12/4641; H04L 45/64; H04L 45/50
See application file for complete search history.

(56) References Cited

U.S. PATENT DOCUMENTS

| | | | |
|---|---|---|---|
| 9,331,940 B2 | 5/2016 | Balus et al. | |
| 9,374,301 B2 | 6/2016 | Kancherla | |
| 9,450,817 B1 * | 9/2016 | Bahadur | H04L 45/64 |
| 9,847,915 B2 | 12/2017 | Ashwood-Smith et al. | |
| 2011/0235599 A1 * | 9/2011 | Nam | H04L 1/0027 370/329 |
| 2015/0207677 A1 | 7/2015 | Choudhury et al. | |
| 2017/0012895 A1 | 1/2017 | Zhao et al. | |
| 2017/0272783 A1 | 9/2017 | Bachmutsky et al. | |
| 2017/0272792 A1 | 9/2017 | Bachmutsky et al. | |
| 2019/0028381 A1 * | 1/2019 | Li | H04L 29/06 |

FOREIGN PATENT DOCUMENTS

| | | |
|---|---|---|
| WO | WO 2015/117385 A1 | 8/2015 |
| WO | WO 2017/118880 A1 | 7/2017 |
| WO | WO 2018/006654 A1 | 1/2018 |
| WO | WO 2018/020293 A1 | 2/2018 |

OTHER PUBLICATIONS

Vidal et al.; "RAUflow: Building Virtual Private Networks with MPLS and OpenFlow"; ACM Proceedings of the workshop on Fostering Latin-American Research in Data Communications Networks; 2016; 4 pages.
Pandey, Pankaj Kumar; "Segment Routing-Future of IP/MPLS"; Int'l Conf. on Advance Studies in Engineering and Sciences; Dec. 2017; 9 pages.

* cited by examiner

*Primary Examiner* — Wei Zhao
(74) *Attorney, Agent, or Firm* — BakerHostetler (57) ABSTRACT

Methods and systems may use a software-defined network (SDN) based approach for interworking different types of nodes. In an example, an SDN controller may include components that assist in building pseudowires across Ethernet virtual private network (EVPN) nodes and Border gateway protocol-virtual private wire service (BGP-VPWS) nodes.

20 Claims, 8 Drawing Sheets

VIRTUAL PRIVATE WIRE SERVICE INTERWORKING

BACKGROUND

Most networks are based on Ethernet technology. Ethernet services, which were for local networks, now can be used over a wide area network. Border gateway protocol-virtual private wire service (BGP-VPWS) became a widely used technology, which allows for point-to-point services. Now, the industry has developed the Ethernet virtual private network (EVPN) technology that may provide the same features as BGP-VPWS and at better scale and performance. BGP-VPWS and EVPN-VPWS are different in several ways; therefore, there is a need to develop a way to interwork the BGP-VPWS technology and EVPN-VPWS technology.

SUMMARY

In recent years, industry has developed the EVPN-VPWS technology, which can provide the same features as BGP-VPWS and more, which may be at better scale and performance. However, the industry does not specify a way to interwork these two technologies and leaves it open to the provider and equipment manufacturer to work out how this may be accomplished. Disclosed herein is a software-defined network (SDN) based approach for interworking EVPN-VPWS and BGP-VPWS.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

There are many different VPN technologies in existence today. In recent years, industry has developed the EVPN technology, which can provide similar features as older VPN technologies and more, which may be at better scale and performance. Disclosed herein is a software-defined network (SDN) based approach for interworking different network protocols, such as virtual private networks protocols (e.g., BGP-VPWS or EVPN-VPWS) or other protocols.

BGP-VPWS or EVPN-VPWS technology (e.g., protocols) have a control plane and a data plane. Control plane may be considered language and intent while data plane represents the physical work of moving the packet from point A to point B. The language, how the intention is exchanged, are often different between protocols. SDN-Mapper, as disclosed herein, may leverage this constancy of intent by translating between the languages so the intent may be understood on either side (BGP-VPWS or EVPN-VPWS). As further described herein, once an SDN-Mapper configures the control plane, a first speaking node may send traffic directly to a second speaking node, wherein the first speaking node and the second speaking node are not natively compatible. The SDN-Mapper is generally not in the path of the traffic forwarding. The SDN-Mapper may be integrated into an SDN-Controller that translates the information in the control plane as much as possible to preserve the intrinsic behavior of the first speaking node and the second speaking node. The use of the SDN-Mapper may minimize the need to make new development on older nodes (e.g., first speaking node) in order to interwork it with a newer node (e.g., second speaking node).

In other solutions (e.g., non-SDN-Mapper solutions) with regard to interworking (described in more detail further below), the control plane and data plane are tightly coupled and customer traffic flows through the node that provides the interworking solution. The SDN-Mapper implementation allows for decoupling of the control plane from the data plane so that the bulk of customer (e.g., regular data) traffic flows directly between the first speaking node and the second speaking node. Because of these attributes, a network service overlay boundary does not need to exist any longer.

Figure 1A:
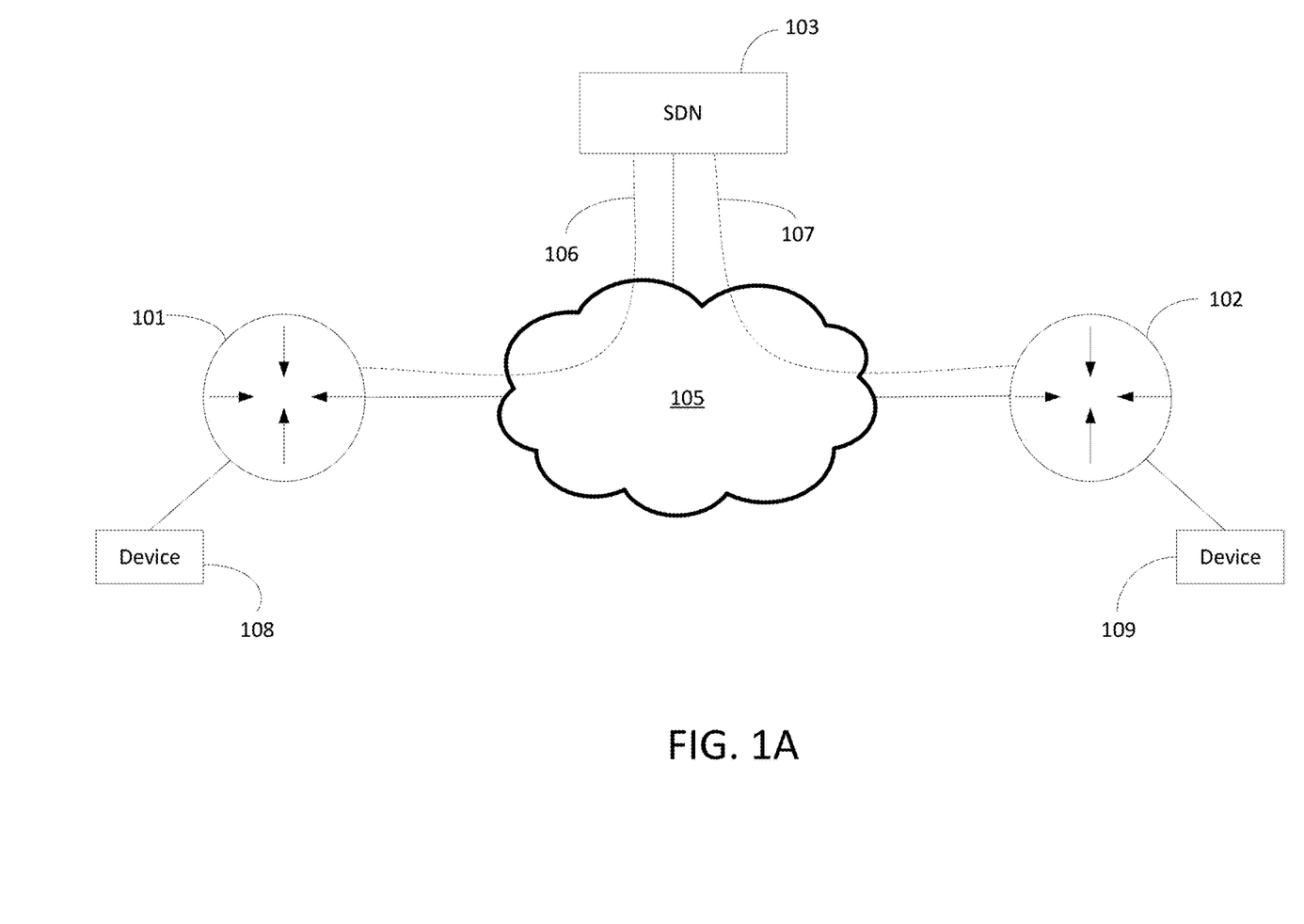
FIG. 1A illustrates an exemplary network that may include an SDN-mapper component.

FIG. 1A illustrates an exemplary network that may include an SDN-mapper component. Discussed below are exemplary components of SDN-Mapper 103 (e.g., SDN controller) that may assist in building a pseudowire across EVPN (used interchangeably with EVPN-VPWS) and BGP (used interchangeably with BGP-VPWS) speakers. SDN-Mapper 103 may include a mapping table. BGP node 101 may be communicatively connected with SDN-Mapper 103, particularly with regard to control messages, as indicated by dotted line 106. EVPN node 102 may be communicatively connected with SDN-Mapper 103, particularly with regard to control messages, as indicated by dotted line 107. As disclosed in more detail herein, BPG node 101 may be communicatively connected through the data plane across network 105 to EVPN node 102 using a virtual private wire service (VPWS).

EVPN utilizes control plane learning to distribute "state" amongst members of a controlled user group (CUG). BGP VPWS uses the control plane to distribute PW endpoints as labels (also referred to herein as PW labels). The label maps VLANs. As disclosed in more detail herein, SDN-Mapper 103 may translate the label values build across pseudowires, in order to correctly convert the information from an EVPN-VPWS node into messages that BGP-VPWS nodes can understand and use to forward packets directly to EVPN-VPWS nodes. SDN Mapper 103 may obtain instructions from a provisioning system when the Pt-Pt private wire (PW) is provisioned on any old or new equipment. This is the offset needed in the formula to correctly translated control messages when this offset changes from PW to PW. The information may include the ROUTE Target associated with the specific PW and the corresponding OFFSET. Additional instructions are needed to tell SDN-Mapper 103 how to convert this information. These instructions are in a mapping table. The mapping data is used for converting information from BGP-VPWS nodes into messages that EVPN-VPWS nodes can process to forward traffic directly to BGP-VPWS nodes (and vice versa).

Functionality of SDN-Mapper 103 may be scaled out to a plurality of SDN-Mappers 103 for resiliency and capacity. SDN-Mapper 103 may be connected with a network, such as network 105. For further clarification, SDN-Mapper 103 should get the control information (e.g., routing information) from the BGP-VPWS nodes 101 and EVPN-VPWS nodes 102 and distribute the translated information to these nodes.

Figure 1B:
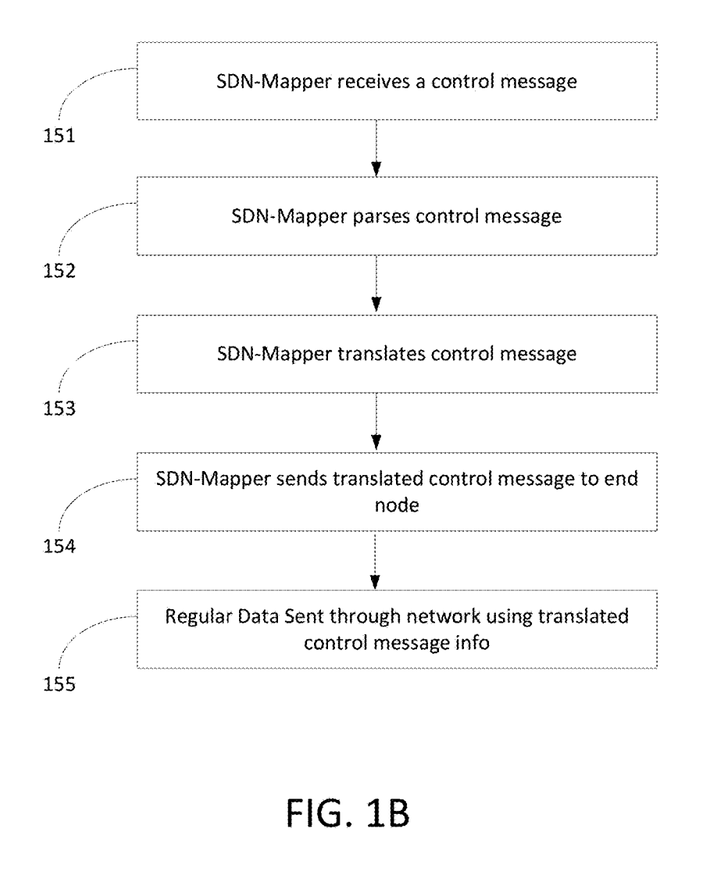
FIG. 1B illustrates an exemplary system that may include an SDN-mapper component for BPS-VPWS and EVPN-VPWS interworking.

FIG. 1B illustrates an exemplary method for BGP-VPWS 101 and EVPN-VPWS 102 using SDN Mapper 103. SDN-Mapper 103 may be integrated into an SDN-Controller that translates the information in the control plane as much as possible to preserve the intrinsic behavior of BGP-VPWS node 101 and EVPN-VPWS node 102. At step 15, SDN-mapper 103 receives a control message that is advertised from BGP-VPWS node 101 for EVPN-VPWS node 102 for a particular route target, such as device 109. At step 152, SDN-Mapper 103 parses the information from the control message received at step 151. The SDN-Mapper 103 may determine from the parsed information certain information relevant to the conversion process regarding forwarding (e.g., routing) of data in network 105, which may include next-hop, VE-ID, label value, or other attributes. At step 153, SDN-Mapper 103 appropriately translates the information parsed (e.g., information determined to be relevant to the conversion process) at step 152. SDN-Mapper 103 may create a table (or the like) that translates (e.g., converts) EVPN-VPWS or BGP-VPWS control information (e.g., routing information) to the control information of BGP-VPWS or EVPN-VPWS, respectively. At step 154, after the appropriate control information is determined at step 153, SDN Mapper 103 sends the appropriate node (e.g., EVPN-VPWS node 102 or BGP-VPWS node 101) control information that will allow a sending-node to route regular data (also referred to as "data" without "control plane") to an EVPN-VPWS node (if the sending-node is a BGP-VPWS node) or a BPG-VPWS node (if the sending-node is an EVPN-VPWS node). This method allows the native EVPN-VPWS nodes or BGP-VPWS nodes (e.g., EVPN-VPWS node 102 or BGP-VPWS node 101) to continue operating as designed.

Figure 2A:
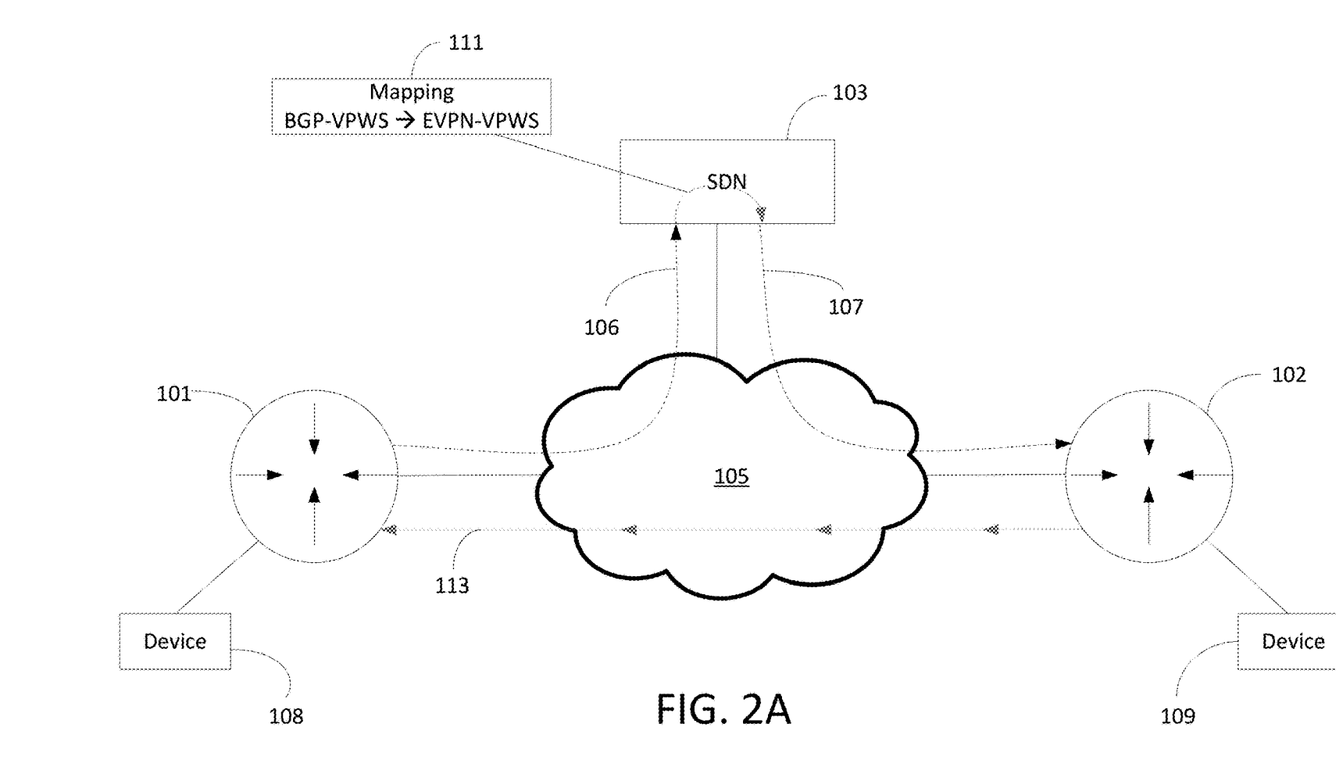
FIG. 2A illustrates an exemplary system that may include an SDN-mapper component for BPS-VPWS and EVPN-VPWS interworking, in which Control Plane Flow from BGP-VPWS to EVPN.

With reference to the method of FIG. 1B, FIG. 2A illustrates an exemplary system in which BGP-VPWS node 101 communicates with SDN Mapper 103. At step 151, SDN Mapper 103 may obtain a control message from BGP-VPWS node 101 via communication session 106 for control information. The control message of step 151 may be a BGP Update created and advertised by BGP-VPWS node 101, in which the BGP Update may include the route target (e.g., 13970:34295 {16 bit:32 bit, or 32 bit:16 bit number}), route-distinguisher (RD) (e.g., 13492:34950 16 bit:32 bit or 32 bit:16 bit number), or PW label (e.g., 34214 2{20 bit number}). At step 153, SDN Mapper 103 determines how to map the control message of BGP-VPWS node 101 of step 151 into a control message that EVPN-VPWS node 102 can understand (e.g., message in the same language). SDN Mapper 103 inserts the mapping into mapping table 111, as show in FIG. 2A. The equation for the mapping may be may be: conversion-BGP-VPWS=(VE ID+1)+PW label. The generic equation is VE ID+−OFFSET. The degenerate case is OFFSET=1 for all PW between old and new nodes.

As shown in FIG. 2A, the result of the mapping may be an EVI context label=#Z for EVPN-VPWS node 103. For example, EVPN-Label=BGP-VPWS Label+OFFSET where OFFSET can be + or −. At step 154, SDN Mapper 103 sends translated control message of step 153 to EVPN-VPWS node 102 via communication session 107 for control information. At step 155, regular data destined for BGP-VPWS node 101 from EVPN-VPWS node 102 may be sent through network 105 (e.g., regular data communication session 113) using control information of control message (EVI context label=#Z) of step 154.

Figure 2B:
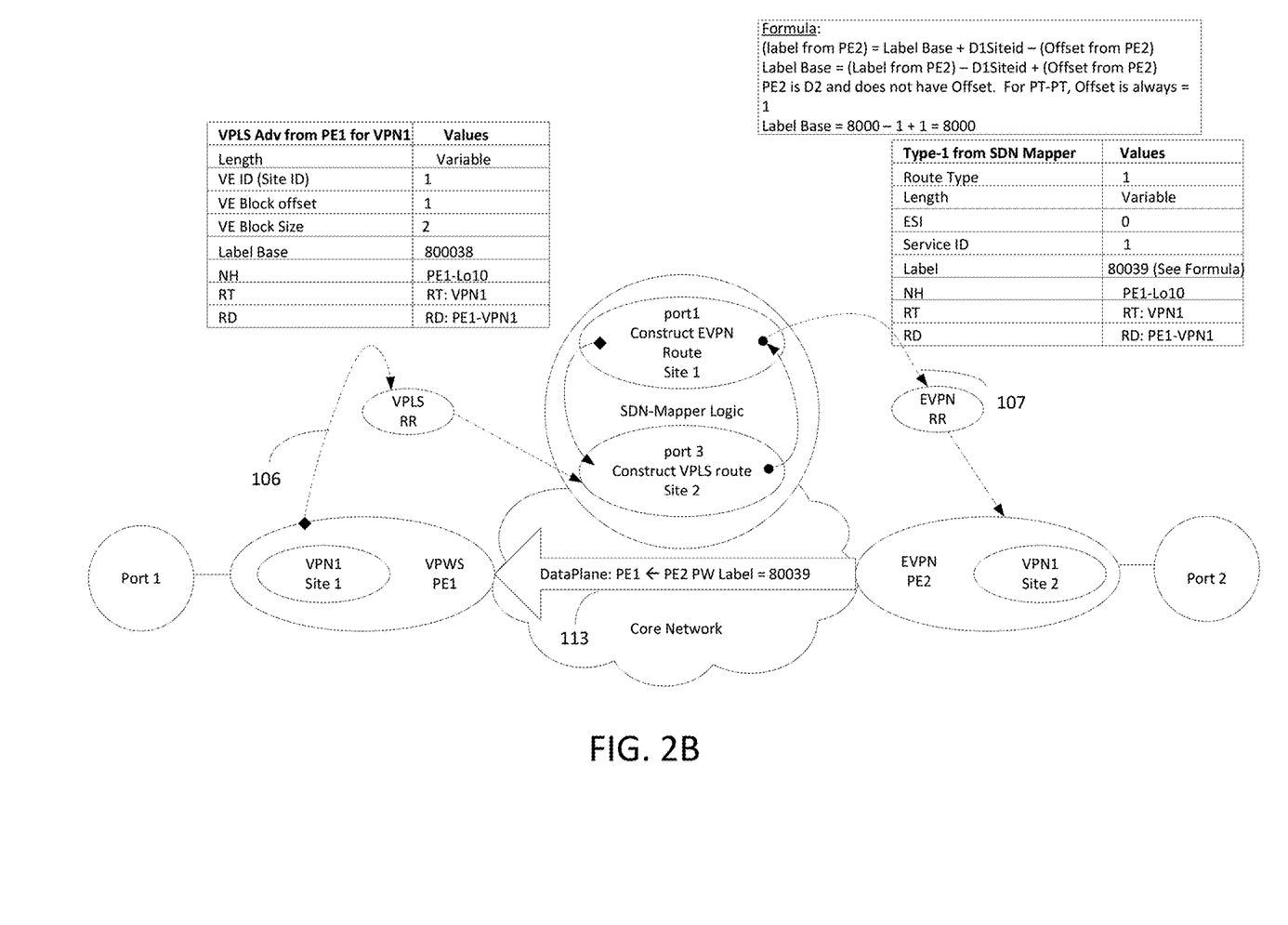
FIG. 2B illustrates an exemplary system that may include an SDN-mapper component for BPS-VPWS and EVPN-VPWS interworking, in which Control Plane Flow from BGP-VPWS to EVPN.

For the scenario associated with FIG. 2A, it is understood that RT, RD maintained as is. In addition, BGP-VPWS PW Label is written into the update as the EVPN context label. As this is VPWS there is no MAC learning, thus the label may be thought of as similar to the VLAN. FIG. 2B is an exemplary implementation of what is disclosed herein with regard to FIG. 2A.

Figure 3A:
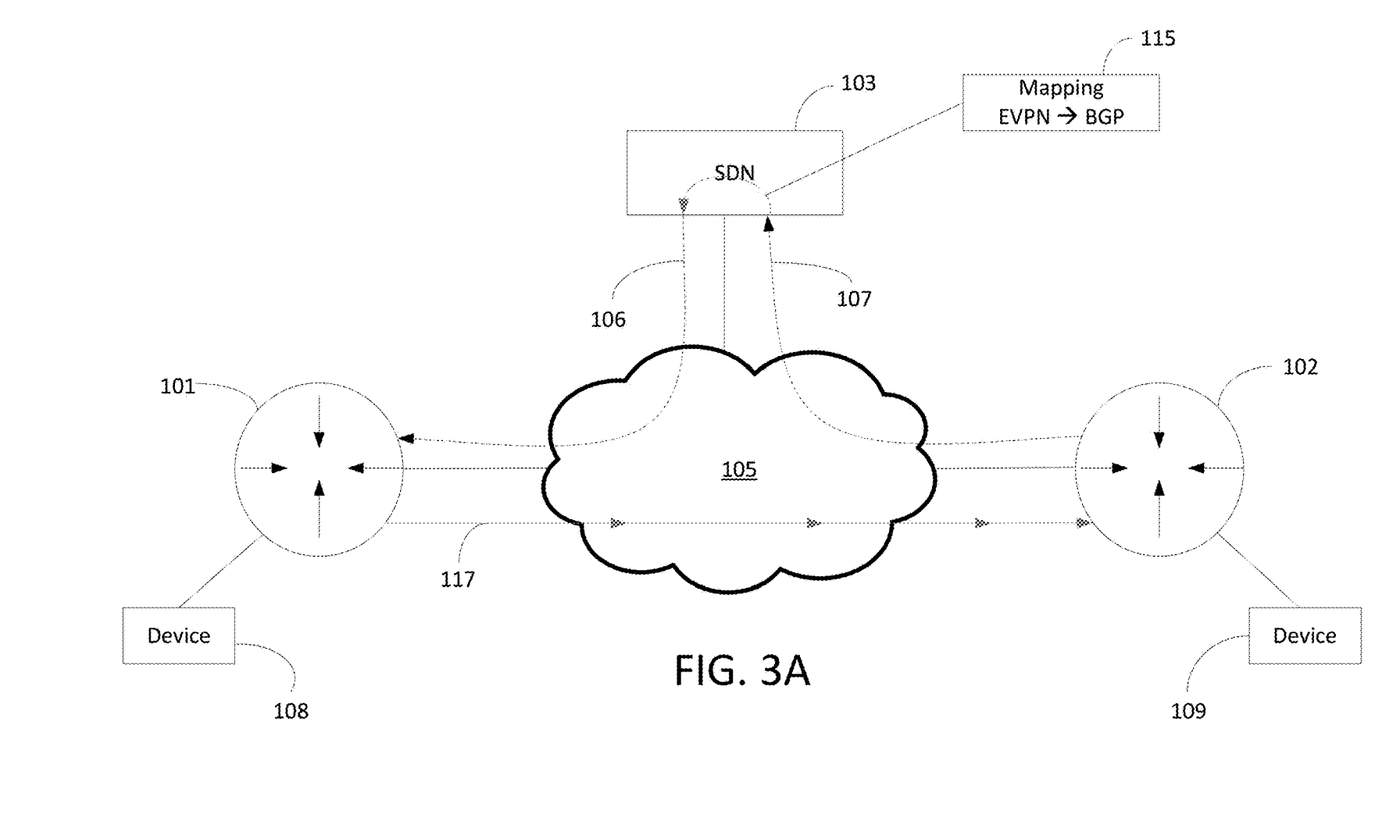
FIG. 3A illustrates an exemplary system that may include an SDN-mapper component for BPS-VPWS and EVPN-VPWS interworking, in which Control Plane Flow from EVPN to BG-BPWS.

With reference to the method of FIG. 1B, FIG. 3A illustrates an exemplary system in which EVPN-VPWS node 102 communicates with SDN Mapper 103. At step 151, SDN Mapper 103 may obtain a control message from EVPN-VPWS node 102 via communication session 107 for control information. The control message of step 151 may be a BGP Update created and advertised by EVPN-VPWS node 102, in which the BGP Update may include the route target (e.g., {16 bit:32 bit, or 32 bit:16 bit number}), route-distinguisher (RD) (e.g., {16 bit:32 bit, or 32 bit:16 bit number}), or EVPN context label (e.g., #Z). At step 153, SDN Mapper 103 determines how to map the control message of EVPN-VPWS node 102 of step 151 into a control message that BGP-VPWS node 101 can understand. SDN Mapper 103 inserts the mapping into mapping table 115, as show in FIG. 3A. The equation for the mapping may be may be: conversion-EVPN-Label=BGP-VPWS Label+OFFSET where OFFSET can be + or −. As shown in FIG. 3A, the result of the mapping may be an PW label=#Y for BGP-VPWS node 101. At step 154, SDN Mapper 103 sends translated control message of step 153 to BGP-VPWS node 101 via communication session 106 for control information. At step 155, regular data destined for EVPN-VPWS node 102 from BGP-VPWS node 101 may be sent through network 105 (e.g., regular data communication session 117) using control information of control message (PW label=#Y) of step 154.

Figure 3B:
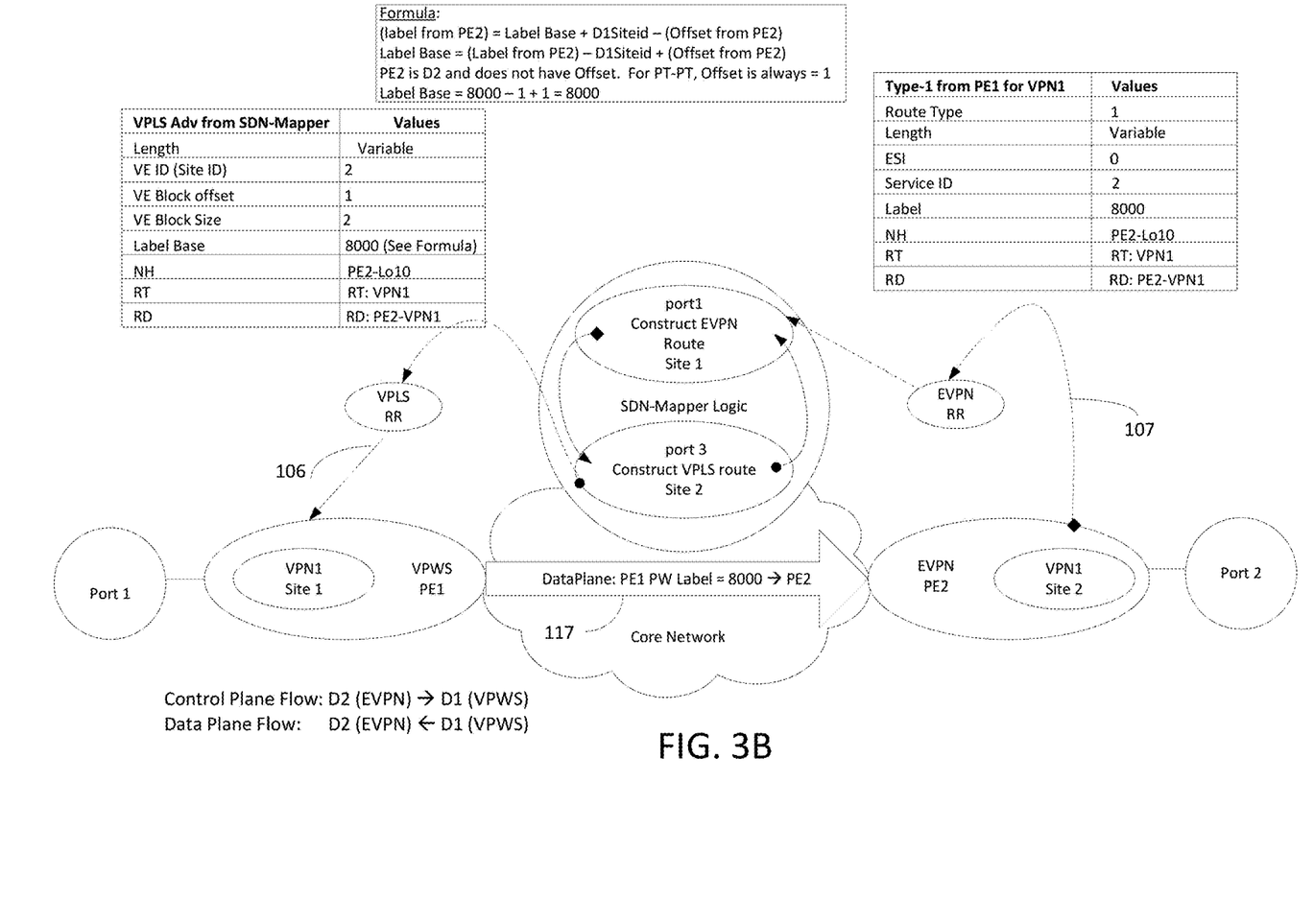
FIG. 3B illustrates an exemplary system that may include an SDN-mapper component for BPS-VPWS and EVPN-VPWS interworking, in which Control Plane Flow from EVPN to BG-BPWS.

For the scenario associated with FIG. 3A, it is understood that RT, RD maintained as is. In the example, EVPN Context Label is written in the update as the BGP-VPWS PW label. As this is VPWS there is no MAC learning, thus the label can be thought of as the equivalent to the VLAN. BGP/VPWS defines a "label block" of two elements, the context label needs to be the complimentary label as would be defined by the VE-ID at the remote site. This can be gleaned from the original update. The EVPN Context Label should "appear" as the complementary VE-ID label at the remote site. FIG. 3B is an exemplary implementation of what is disclosed herein with regard to FIG. 3A.

The disclosed subject matter may be viewed in the following manner in some aspects: using a network controller to obtain a control message that is advertised from a first node of a first network VPN service; parse for first information in the control message, the first information comprising control information associated with routing data messages to the first node; and converting the first information to second information, wherein the second information comprises control information for forwarding data messages of a second network VPN service to the first node and wherein the first network VPN service is not natively compatible with the second network VPN service (e.g., EVPN-VPWS versus BGP-VPWS). A VPN service may be considered a multi-point layer 2 VPN or the like.

It is contemplated herein that for FIG. 1B, the processing flow applies to both FIG. 1A and FIG. 2A. The processing flow applies in either direction. The formula used in each direction is expressed differently in each direction. The general formula can accommodate an arbitrary OFFSET per pseudowire. If such a case is used, the processing flow may use additional information that would be provided from a provisioning system. This information may have the following data: Route Target (specify the specific pseudowire) and the corresponding OFFSET for each direction.

Decoupling the data and control planes allows for a scalable and cost effective solution that enables communication between otherwise disparate communication protocols (e.g., VPWS & EVPN). Utilizing the existing core network for customer traffic eliminates the need for a capacity limiting (40 Gig bandwidth) that may be costly and potentially a single point of failure server infrastructure.

Figure 4:
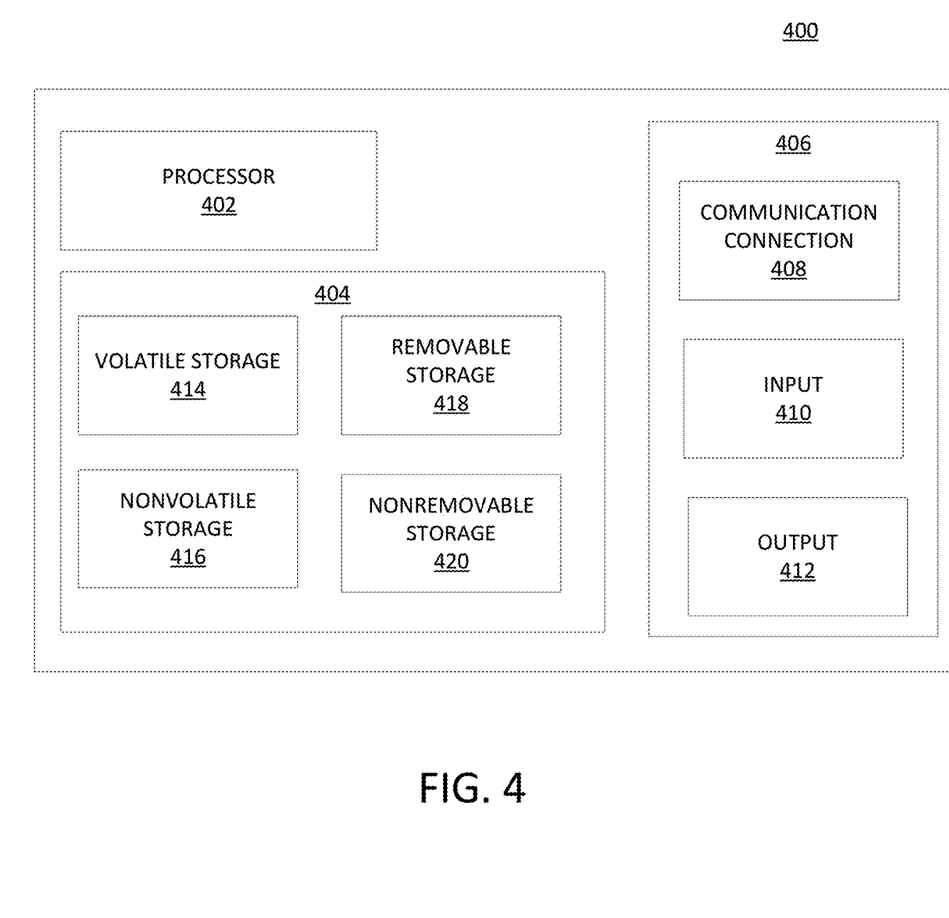
FIG. 4 illustrates a schematic of an exemplary network device.

FIG. 4 is a block diagram of network device 400 that may be connected with or comprise a component of network 105. Network device 400 may comprise hardware or a combination of hardware and software. The functionality to facilitate telecommunications via a telecommunications network may reside in one or combination of network devices 400. Network device 400 depicted in FIG. 4 may represent or perform functionality of an appropriate network device 400, or combination of network devices 400, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 400 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 400 may comprise a processor 402 and a memory 404 coupled to processor 402. Memory 404 may contain executable instructions that, when executed by processor 402, cause processor 402 to effectuate operations associated with mapping wireless signal strength. As evident from the description herein, network device 400 is not to be construed as software per se.

In addition to processor 402 and memory 404, network device 400 may include an input/output system 406. Processor 402, memory 404, and input/output system 406 may be coupled together (coupling not shown in FIG. 4) to allow communications between them. Each portion of network device 400 may comprise circuitry for performing functions associated with each respective portion. Thus, each portion may comprise hardware, or a combination of hardware and software. Accordingly, each portion of network device 400 is not to be construed as software per se. Input/output system 406 may be capable of receiving or providing information from or to a communications device or other network entities configured for telecommunications. For example input/output system 406 may include a wireless communications (e.g., 3G/4G/GPS) card. Input/output system 406 may be capable of receiving or sending video information, audio information, control information, image information, data, or any combination thereof. Input/output system 406 may be capable of transferring information with network device 400. In various configurations, input/output system 406 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 406 may comprise a Wi-Fi finder, a two-way GPS chipset or equivalent, or the like, or a combination thereof.

Input/output system 406 of network device 400 also may contain a communication connection 408 that allows network device 400 to communicate with other devices, network entities, or the like. Communication connection 408 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 406 also may include an input device 410 such as keyboard, mouse, pen, voice input device, or touch input device. Input/output system 406 may also include an output device 412, such as a display, speakers, or a printer.

Processor 402 may be capable of performing functions associated with telecommunications, such as functions for processing broadcast messages, as described herein. For example, processor 402 may be capable of, in conjunction with any other portion of network device 400, determining a type of broadcast message and acting according to the broadcast message type or content, as described herein.

Memory 404 of network device 400 may comprise a storage medium having a concrete, tangible, physical structure. As is known, a signal does not have a concrete, tangible, physical structure. Memory 404, as well as any computer-readable storage medium described herein, is not to be construed as a signal. Memory 404, as well as any computer-readable storage medium described herein, is not to be construed as a transient signal. Memory 404, as well as any computer-readable storage medium described herein, is not to be construed as a propagating signal. Memory 404, as well as any computer-readable storage medium described herein, is to be construed as an article of manufacture.

Memory 404 may store any information utilized in conjunction with telecommunications. Depending upon the exact configuration or type of processor, memory 404 may include a volatile storage 414 (such as some types of RAM), a nonvolatile storage 416 (such as ROM, flash memory), or a combination thereof memory 404 may include additional storage (e.g., a removable storage 418 or a non-removable storage 420) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 400. Memory 404 may comprise executable instructions that, when executed by processor 402, cause processor 402 to effectuate operations to map signal strengths in an area of interest.

Figure 5:
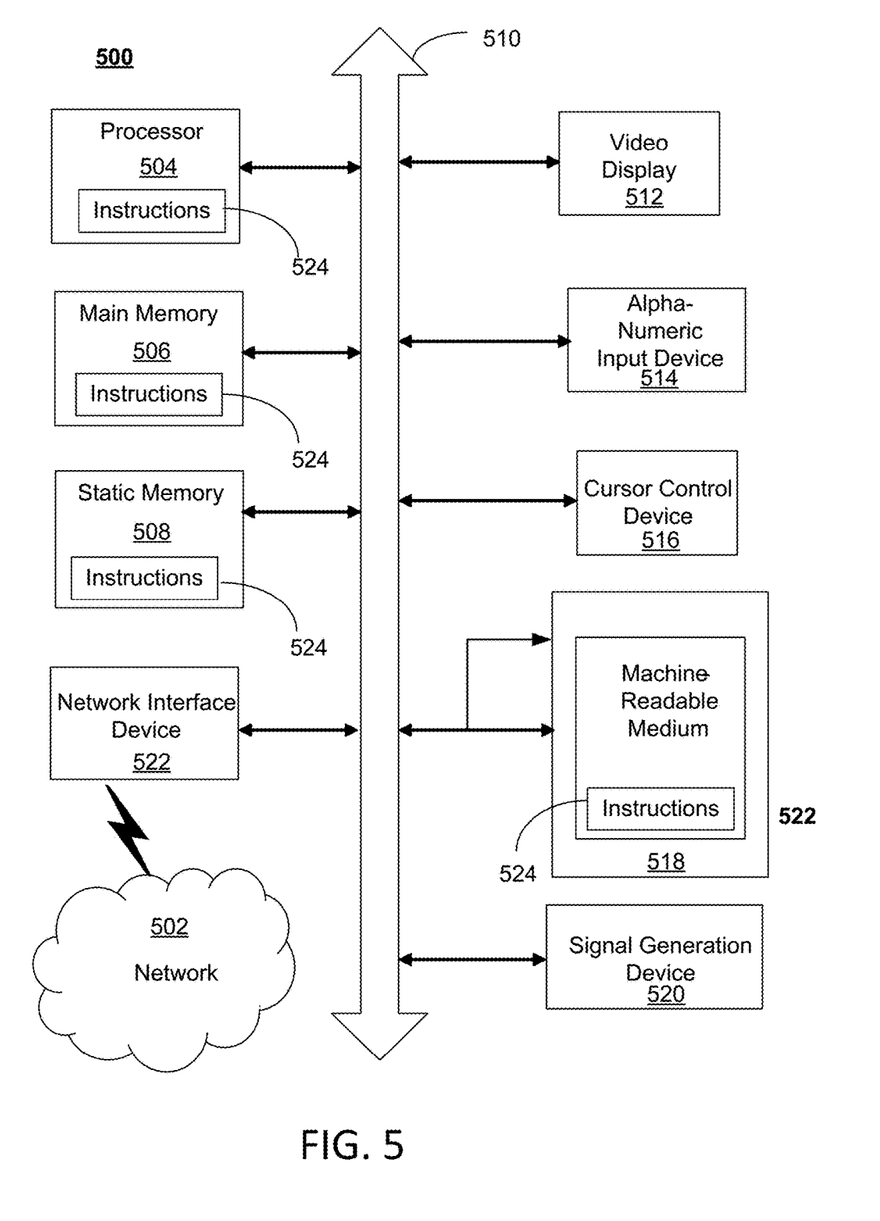
FIG. 5 illustrates an exemplary an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 402, SDN-Mapper 103, BGP-VPWS node 101, EVPN-VPWS node 102, device 108, device 109, and other devices of FIG. 1A, FIG. 2A, FIG. 3A, or other figures. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system wherein management and control utilizing a software designed network (SDN) are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which EVPN-VPWS and BGP-VPWS interworking as disclosed herein may be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—BGP-VPWS and EVPN-VPWS Interworking—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A software-defined network (SDN) controller comprising:
    a processor; and
    a memory coupled with the processor, the memory comprising executable instructions that when executed by the processor cause the processor to effectuate operations comprising:
        obtaining a control message that is advertised from a border gateway protocol-virtual private wire service (BGP-VPWS) node;
        parsing for first information in the control message, the first information comprising control information associated with routing data messages to the BGP-VPWS node; and
        converting the first information to second information, the second information comprising control information for forwarding Ethernet virtual private network (EVPN) data messages to the BGP-VPWS node.
2. The SDN controller of claim 1, further operations comprising sending the second information to an EVPN node, the EVPN node comprising an EVPN route reflector.
3. The SDN controller of claim 1, further operations comprising sending the second information to an EVPN node, the EVPN node comprising an EVPN router.
4. The SDN controller of claim 1, wherein the first information in the control message comprises a route target attribute.
5. The SDN controller of claim 1, wherein the first information in the control message comprises an offset.
6. The SDN controller of claim 1, wherein the second information comprises a label value.
7. A system comprising:
    a border gateway protocol-virtual private wire service (BGP-VPWS) node; and
    a software-defined network (SDN) controller communicatively connected with the BGP-VPWS node, the SDN controller comprising:
        a processor; and
        a memory coupled with the processor, the memory comprising executable instructions that when executed by the processor cause the processor to effectuate operations comprising:
            obtaining a control message that is advertised from the BGP-VPWS node;
            parsing for first information in the control message, the first information comprising control information associated with routing data messages to the BGP-VPWS node; and
            converting the first information to second information, the second information comprising control information for forwarding Ethernet virtual private network (EVPN) data messages to the BGP-VPWS node.
8. The system of claim 7, further operations comprising sending the second information to an EVPN node, the EVPN node comprising an EVPN route reflector.
9. The system of claim 7, further operations comprising sending the second information to an EVPN node, the EVPN node comprising an EVPN router.
10. The system of claim 7, wherein the first information in the control message comprises a route target attribute.
11. The system of claim 7, wherein the first information in the control message comprises an offset.
12. The system of claim 7, wherein the second information comprises a label value.
13. The system of claim 7, further operations comprising:
    sending the second information to an EVPN node, the EVPN node comprising an EVPN router; and
    responsive to the sending of the second information, receiving data across a data plane from the EVPN router.
14. A method, the method further comprising:
    obtaining a control message that is advertised from a border gateway protocol-virtual private wire service (BGP-VPWS) node;
    parsing for first information in the control message, the first information comprising control information associated with routing data messages to the BGP-VPWS node; and
    converting the first information to second information, the second information comprising control information for forwarding Ethernet virtual private network (EVPN) data messages to the BGP-VPWS node.
15. The method of claim 14, further comprising sending the second information to an EVPN node, the EVPN node comprising an EVPN route reflector.
16. The method of claim 14, further comprising sending the second information to an EVPN node, the EVPN node comprising an EVPN router.
17. The method of claim 14, wherein the first information in the control message comprises a route target attribute.

18. The method of claim 14, wherein the first information in the control message comprises an offset.

19. The method of claim 14, wherein the second information comprises a label value.

20. The method of claim 14, further comprising:
sending the second information to an EVPN node, the EVPN node comprising an EVPN router; and
responsive to the sending of the second information, receiving data across a data plane from the EVPN router.

* * * * *